(12) United States Patent
Brivet et al.

(10) Patent No.: US 7,974,812 B2
(45) Date of Patent: Jul. 5, 2011

(54) METHOD FOR DETERMINING THE TOTAL TEMPERATURE OF AN AIRFLOW SURROUNDING AN AIRCRAFT

(75) Inventors: Valerie Brivet, Leguevin (FR); Philippe Gaucheron, Fontenilles (FR); Stephane Saint-Aroman, Toulouse (FR)

(73) Assignee: Airbus France, Toulouse (FR)

( * ) Notice: Subject to any disclaimer, the term of this patent is extended or adjusted under 35 U.S.C. 154(b) by 258 days.

(21) Appl. No.: 12/279,371

(22) PCT Filed: Feb. 1, 2007

(86) PCT No.: PCT/FR2007/050724
§ 371 (c)(1),
(2), (4) Date: Oct. 29, 2008

(87) PCT Pub. No.: WO2007/093722
PCT Pub. Date: Aug. 23, 2007

(65) Prior Publication Data
US 2009/0306927 A1  Dec. 10, 2009

(30) Foreign Application Priority Data
Feb. 14, 2006 (FR) ..................... 06 50531

(51) Int. Cl.
*G01K 1/00* (2006.01)

(52) U.S. Cl. ....................................................... 702/130
(58) Field of Classification Search ................... 702/130
See application file for complete search history.

(56) References Cited

U.S. PATENT DOCUMENTS
2002/0131474 A1* 9/2002 Suga ............................ 374/138

FOREIGN PATENT DOCUMENTS
| EP | 1275947 A2 | 1/2003 |
| EP | 1586877 A | 10/2005 |
| EP | 1602905 A | 12/2005 |
| WO | WO2005020175 | * 3/2005 |

OTHER PUBLICATIONS
International Search Report dated Sep. 14, 2007.

* cited by examiner

*Primary Examiner* — Drew A Dunn
*Assistant Examiner* — Stephen J Cherry
(74) *Attorney, Agent, or Firm* — Perman & Green, LLP

(57) ABSTRACT

A method for determining the total temperature of the air stream surrounding an aircraft, including the following operations; measuring a parameter of static temperature, measuring a parameter of total temperature, determining a value of speed of the air stream, determining a total temperature computed from the parameters of measured static temperature and measured total temperature as a function of the speed of the air stream.

9 Claims, 1 Drawing Sheet

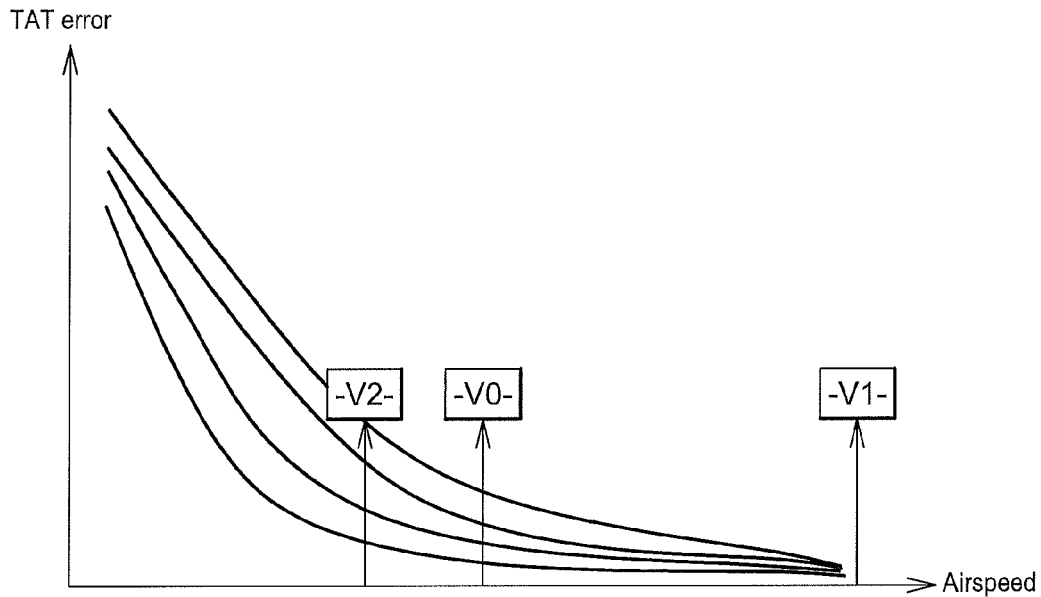

Fig. 1

| Speeds | acceleration | deceleration |
|---|---|---|
| <V2 | $TAT_{computed}(t) = SAT_{measured}(t)$ | $TAT_{computed}(t) = SAT_{measured}(t) - \Delta T_{V2} * (t-t_{V2}) / T_{convergence}$ where $TAT_{computed}(t) = SAT_{measured}(t)$ |
| from V2 to V0 | $TAT_{computed}(t) = SAT_{measured}(t)$ where $\Delta T_{V0} = TAT_{measured}(t_{V0}) - TAT_{computed}(t_{V0})$ | $TAT_{computed}(t) = TAT_{measured}(t)$ where $\Delta T_{V2} = SAT_{measured}(t_{V2}) - TAT_{computed}(t_{V2})$ |
| from V0 to V1 | $TAT_{computed}(t) = TAT_{measured}(t) - \Delta T_{V0} * (V1-CAS(t)) / (V1-V0)$ | $TAT_{computed}(t) = TAT_{measured}(t)$ |
| >V1 | $TAT_{computed}(t) = TAT_{measured}(t)$ | $TAT_{computed}(t) = TAT_{measured}(t)$ |

Fig. 2

METHOD FOR DETERMINING THE TOTAL TEMPERATURE OF AN AIRFLOW SURROUNDING AN AIRCRAFT

CROSS REFERENCE TO RELATED APPLICATIONS

This application is the National Stage of International Application No. PCT/FR2007/050724 International Filing Date, 1 Feb. 2007, which designated the United States of America, and which International Application was published under PCT Article 21 (2) as WO Publication No. WO2007/093722 and which claims priority from French Application No. 0650531, filed on 14 Feb. 2006, the disclosures of which are incorporated herein by reference in their entireties.

BACKGROUND

1. Field

The disclosed embodiments relate to a method to determine the total temperature of the air stream surrounding an aircraft, especially when the aircraft is on the ground. The determining of the total temperature, according to the method of the disclosed embodiments, takes account of the measured values of the static temperature and the measured values of the total temperature.

The disclosed embodiments find application in aeronautics, especially in the measurement of parameters such as the parameters of air temperature outside the aircraft.

2. Brief Description of Related Developments

On board an aircraft, it is important to have certain items of information on the flight of the aircraft and especially the air temperature outside the aircraft. The air temperature outside the aircraft is measured by means of dedicated probes or multi-functional probes placed in the external structure of the aircraft. The external air temperature of the aircraft is generally given by the total temperature and by the static temperature. The total temperature is the temperature of the air stream around the aircraft in the presence of an air flow acting on the value of the temperature. The static temperature is the temperature of the air stream surrounding the aircraft under conditions such that the air flow has no influence on its value.

The total temperature is classically measured by one or more probes situated in the air flow and the static air temperature is computed from the measured values of the total temperature. The probes used to measure the total temperature are generally either autonomous probes dedicated to the measurement of temperature or probes associated with other sensors to form multi-functional probes. Whether autonomous or multi-functional, the probes are installed on board the aircraft, outside the aircraft, in an environment subjected to the air flow.

Since the external air temperature is extremely low, especially in flight, the probes are generally heated in order to prevent them from getting iced. In particular, in the case of multi-functional probes, de-icing is automatically set up as soon as the engine is started up. However, the heating of the probes necessarily entails an emission of heat. This heat may disturb the measurements by the probe, under certain conditions.

More specifically, when the aircraft is in flight, the air stream flowing around the probe dissipates the de-icing heat. The effect of the de-icing, i.e. the heating of the probe, can then be characterized and can therefore be corrected. In this case, the probe gives a precise and consistent total temperature. However, when the aircraft is on the ground, there is no air stream or hardly any air stream around the aircraft. The heat from the heating of the probe therefore cannot be removed. This heat from the heating is therefore taken into account by the probe and the total temperature measurement is therefore falsified.

To resolve this problem, it is possible not to de-ice the total temperature probe except beyond a certain speed of the air flow. The probe would therefore not be de-iced so long as the aircraft is on the ground. However, in this case, the measurements of total air temperature on the ground would depend on weather conditions. Indeed, in the event of snow or intense cold, when the aircraft is one the ground there is a risk that the probe might get iced and that the values measured by the probe might be erroneous. Furthermore, the probe would also be subjected to temperature differences directly related to exposure to the sun. Now differences in temperature due to climatic conditions cannot be characterized and therefore cannot be corrected.

Thus, whatever the de-icing conditions chosen (de-icing the probe solely off ground or de-icing the probe permanently) current measurement techniques do not provide for a reliable measurement of the total air temperature on the ground.

SUMMARY

The disclosed embodiments are aimed precisely at overcoming the drawbacks of the above-described techniques. To this end, the disclosed embodiments propose a method that can be used to correct the measured value of the total temperature, especially when the aircraft is on the ground or when its speed is too small to create an air flow sufficient to dissipate the heat arising out of the heating of the probe. To this end, the disclosed embodiments propose the measurement of the static temperature and the correction of the measurement of the total air temperature by means of a law of convergence using the measured values of the static and total temperatures as a function of the air speed.

More specifically, the disclosed embodiments relate to a method for determining the total temperature of the air stream surrounding an aircraft, characterized in that it comprises the following operations:

measuring a parameter of static temperature, measuring a parameter of total temperature, determining a value of speed of the air stream, determining a total temperature computed from the parameters of measured static temperature and measured total temperature as a function of the speed of the air stream.

The disclosed embodiments may comprise one or more of the following characteristics:

the computed total temperature corresponds to the measured total temperature or to the measured static temperature, corrected if necessary according to a law of convergence.

the law of convergence differs as a function of the airspeed.

at low speed, the computed total temperature corresponds to the measured static temperature.

at high speed, the computed total temperature corresponds to the measured total temperature.

at intermediate speed the computed total temperature is corrected by a difference between the measured total temperature and the measured static temperature at a given point in time.

in the phase of acceleration of the aircraft, the computed total temperature is $TAT_{computed}(t) = TAT_{measured}(t) - \Delta T_{vo}^* (V1-CAS(t))/(V1-V0)$, where $\Delta Tvo = TAT_{measured}(t_{vo}) - TAT_{computed}(t_{vo})$.

in the deceleration phase of the aircraft, the computed total temperature is $TAT_{computed}(t) = SAT_{measured}(t) - T_{v2} * (t - t_{v2}) / T_{convergence}$, where $\Delta T_{v2} = SAT_{measured}(t_{v2}) - TAT_{computed}(T_{v2})$.

The disclosed embodiments also relate to an aircraft comprising a system that implements the method described here above.

BRIEF DESCRIPTION OF THE DRAWINGS

FIG. 1 represents examples of curves showing the progress of the error of measurement of the total temperature as a function of the airspeed.

FIG. 2 is a table summarizing the laws of convergence to be applied as a function of the airspeed and of the aircraft flight phase.

DETAILED DESCRIPTION OF THE DRAWINGS

The disclosed embodiments relate to a method to determine the total temperature of the air stream surrounding an aircraft, whatever the weather conditions and the speed of the aircraft. This method can be used especially to compute the total temperature of the air stream surrounding the aircraft when this aircraft is on the ground.

This method for determining the total temperature comprises the operations of measuring the total temperature and measuring the static temperature. The total temperature is a parameter measured by means of a probe dedicated to the measurement of total temperature or a multi-functional probe. The static temperature is a parameter measured by means of a static temperature probe which may be dedicated or multi-functional. The measurement of total temperature is corrected by the measurement of static temperature according to a law of convergence which differs as a function of the airspeed. In other words, according to the disclosed embodiments, the total temperature is computed on the basis of the measured values of the total and static temperatures, as a function of the airspeed. The parameter of computed total temperature is determined by the aircraft on-board computer and, more specifically, the ADIRU computer. The airspeed is a parameter known to this computer.

The method of the disclosed embodiments takes account of the fact that, at low speed, the total temperature is close to the static temperature. It is therefore possible, at low speed, to consider the total temperature to be equivalent to the static temperature. Thus, on the ground, when the airspeed is low, it is chosen to approximate the value of the computed total temperature to the value of the static temperature measured by the probe.

On the contrary, at high speed, the air stream is deemed to be sufficient to dissipate the effects of the de-icing. It is then chosen to approximate the value of the computed total temperature to the value of the total temperature measured by the total temperature probe.

At intermediate speed, i.e. at a speed that is too low to ensure the existence of a heat-dissipating air stream and high enough for the air stream to have an effect on the total temperature, the method of the disclosed embodiments proposes to compute the value of the total temperature using at least one law of convergence. The method of the disclosed embodiments thus proposes to make a transition between approximation by the measurement of static temperature and the direct taking into account of the measurement of total temperature. This transition consists of the application of at least one law of convergence.

The law to be applied, namely approximation by the measurement of static temperature and by directly taking account of the measurement of total temperature or the law of convergence, is chosen as a function of the airspeed relative to predefined fixed speeds known as transition speeds.

In a preferred embodiment, the total temperature is computed from several convergence laws, the law applied being a function of the airspeed and of the phase of flight of the aircraft. Indeed, on the ground, the aircraft may be at a standstill or else in a stage of take-off or yet again in a landing phase. In the take-off phase, the aircraft accelerates. In the landing phase, the aircraft decelerates. Depending on whether the aircraft is accelerating or decelerating, the transition speeds between one law of convergence and another law of convergence may vary.

More specifically, the method of the disclosed embodiments takes account of at least two transition speeds, namely a low speed and a high speed. The low transition speed corresponds to the point of passage between a law applied at low speed and a law applied at intermediate speed. The high transition speed corresponds to the point of passage between the law applied at intermediate speed and a law applied at high speed.

Below the low transition value, the static temperature is precise enough for the total computed temperature to be approximated to the measured static temperature. Beyond the high transition speed, the air stream is sufficient to dissipate the de-icing heat; the total temperature computed can then be approximated to the value of the measured total temperature. At the passage from the low transition speed, the measurement of the static temperature is always sufficiently precise; it is then enough to compute the difference between the measured static temperature and the measured total temperature to know the amplitude of the correction to be made.

The value of the low and high transition speeds may vary as a function of the aircraft and the flight phase in which the aircraft is situated at the point in time being considered. In particular, at the take-off phase, i.e. when the aircraft is in a phase of acceleration, the low speed chosen is V0 and the high speed chosen is V1. In the landing phase, i.e. when the aircraft is in a phase of deceleration, the transition speed is the speed V2.

Between these transition speeds V0, V2 and V1, which are speeds of the airflow relative to the aircraft, a law of convergence is established enabling a passage, with a soft transition, from approximation to the value of the measured static temperature to approximation to the value of the measured total temperature. Indeed, for reasons of consistency, it is not possible to pass from one approximation to another without transition. The law of convergence established in the disclosed embodiments ensures this transition.

FIG. 1 shows examples of curves depicting the convergence of the total air temperature error (also called TAT error) as a function of the airspeed. These curves show that, below the low transition speed V0 or V2, the total air temperature error is very great and that, therefore, it is not possible to take the measured TAT value as the total air temperature value. They also show that the more the airspeed approaches the high transition speed V1, the greater is the convergence of the TAT error towards 0. Starting from V1, it is therefore possible to approximate the total air temperature by the value of total temperature measured. Between the low transition speed V0 or V2, the disclosed embodiments proposes to measure the divergence between the measured total temperature and the measured static temperature at a given speed and to obtain a convergence of this difference along a curve so that, in the vicinity of the high transition speed V1, this difference is 0.

The convergence can be achieved as a function of the airspeed or else as a function of time so as to take account of inertia if any in the zone in which the static temperature probe is installed.

Thus, the total temperature error can be estimated as a function of the time T, as follows, depending on whether the aircraft is in an acceleration phase or in a deceleration phase:

In the Acceleration Phase:

When the airspeed is lower than the low transition speed V0, then the total air temperature computed corresponds to the value of the measured static temperature. We therefore have:

$$TAT_{computed}(t) = SAT_{measured}(t),$$

Where $TAT_{computed}(t)$ is the total temperature computed at the instant t and $SAT_{measured}(t)$ is the static temperature measured at the instant t.

At the instant of the passage from the transition speed V0, it is possible to determine the difference $\Delta Tvo$ between the total temperature measured and the total temperature computed from the static temperature as follows:

$$\Delta Tvo = TAT_{measured}(t_{vo}) - TAT_{computed}(t_{vo}),$$

Where $TAT_{measured}(t_{vo})$ is the total temperature measured at the instant of the passage of the speed V0.

Thus, at the passage of the transition speed V0, it is possible to determine the difference between the total temperature measured and the total temperature computed. This difference corresponds to the difference between the total air temperature measured and the static air temperature measured.

For speeds included between the low transition speed V0 and the high transition speed V1, the total air temperature computed is determined on the basis of the total air temperature corrected by the difference $\Delta Tvo$ and the airspeed. The total temperature computed is then:

$$TAT_{computed}(t) = TAT_{measured}(t) - \Delta T_{vo} * (V1 - CAS(t))/(V1 - V0),$$

where CAS(t) is the speed of the aircraft (Computer Air Speed) given in knots by the computer of the aircraft.

When the speed reaches the high transition speed V1 and goes beyond it, the total temperature computed corresponds to the total temperature measured. We therefore have:

$$TAT_{computed}(t) = TAT_{measured}(t)$$

In the Deceleration Phase:

When the speed is greater than the high transition speed V1, the computed total temperature corresponds to the value of the measured total temperature. We therefore have:

$$TAT_{computed}(t) = TAT_{measured}(t).$$

At the passage of the low transition speed V2, it is possible to determine the difference $\Delta T_{v2}$ up between the computed total temperature and the measured static temperature as follows:

$$\Delta T_{v2} = SAT_{measured}(t_{v2}) - TAT_{computed}(t_{v2}),$$

Where $SAT_{measured}(t_{v2})$ is the measured static temperature at the instant of passage of the speed V2 and $TAT_{computed}(t_{v2})$ is the computed total temperature at this very same instant.

This difference $\Delta T_{v2}$ therefore corresponds to the difference between the measured static temperature and the measured total temperature.

Below the transition speed V2, the computed total temperature is determined from the measured static temperature, corrected by the difference $\Delta T_{v2}$ as follows:

$$TAT_{computed}(t) = SAT_{measured}(t) - \Delta T_{v2} * (t - t_{v2})/T_{convergence},$$

where $T_{convergence}$ is the duration of convergence towards the static temperature. If the next acceleration occurs while the convergence to the static temperature has not ended, then the computed total temperature remains to be determined from this formula. Beyond the duration of convergence, the total temperature computed is based on the measured static temperature, giving:

$$TAT_{computed}(t) = SAT_{measured}(t).$$

A summary table of the different laws of convergence is shown in FIG. 2. This table shows the laws that can be applied as a function of the flight phase of the aircraft (acceleration and deceleration) and the airspeed.

The transition speeds V0, V1 and V2 are fixed values determined as a function of the aircraft and as a function of climatic factors. For example, the transition speed V0 can be 70 knots and the transition speed V1 can be 100 knots.

The choice of the transition values must take account of a special element of the acceleration phase of the aircraft, namely the case in which the aircraft is in an acceleration phase but has not yet achieved the decisive speed after which it can no longer brake and must obligatorily take off. In this case, the aircraft is both in a phase of acceleration and in a phase of deceleration, for example if the pilot chooses to brake because he has not yet reached this decisive phase. In this case, it is important that the transition speed V2 be chosen so that it is possible to change so as to determine the computed total temperature. It is then necessary to choose the transition speed V2 so that it is lower than the transition speed V0.

In the preferred embodiment, the high and low transition speeds correspond to airspeeds obtained when the aircraft is still on the ground. The application of the method of the disclosed embodiments is especially worthwhile when the aircraft is on the ground for the above-mentioned reasons of de-icing of the probes. It must be noted however that this method can also be applied when the aircraft is in flight.

The invention claimed is:

1. A method for determining the total temperature of the air stream surrounding an aircraft, comprising:
    measuring a static temperature,
    measuring a total temperature,
    determining a value of speed of the air stream,
    determining a computed total temperature from the measured static temperature and measured total temperature as a function of an acceleration or deceleration phase of the aircraft and the speed of the air stream.

2. A method according to claim 1, wherein the computed total temperature corresponds to the measured total temperature or to the measured static temperature, corrected if necessary according to a law of convergence applied as a function of the acceleration or deceleration phase of the aircraft.

3. A method according to claim 2, wherein the law of convergence differs as a function of the airspeed.

4. A method according to claim 2, wherein, at low speed, the computed total temperature corresponds to the measured static temperature.

5. A method according to claim 2, wherein, at high speed, the computed total temperature corresponds to the measured total temperature.

6. A method according to claim 2, wherein, at intermediate speed the computed total temperature is corrected by a difference between the measured total temperature and the measured static temperature at a given point in time.

7. A method according to claim 6, wherein, in the acceleration phase of the aircraft, the total computed temperature is $TAT_{computed}(t) = TAT_{measured}(t) - \Delta T_{vo} * (V1 - CAS(t))/(V1 - V0)$, where $\Delta T_{vo} = TAT_{measured}(t_{vo}) - TAT_{computed}(t_{vo})$, where:
V0 and V1 are transition speeds of airflow relative to the aircraft,
$TAT_{measured}(t)$ is the measured total temperature,
$TAT_{measured}(t_{vo})$ is the measured total temperature at transition speed V0,
$TAT_{computed}(t_{vo})$ is the total computed temperature at transition speed V0, and
CAS(t) is the speed of the aircraft at time t.

8. A method according to claim 6, wherein, in the deceleration phase of the aircraft, the total temperature computed is $TAT_{computed}(t) = SAT_{measured}(t) - \Delta Tv2*(t-tV^2)T_{convergence}$,
where $\Delta Tv2 = SAT_{measured}(t_{v2}) - TAT_{computed}(T_{v2})$,
where:
V2 is a transition speed of airflow relative to the aircraft,
$SAT_{measured}$ is the measured static temperature,
tV2 is the time that the aircraft is at the transition speed V2, and
$T_{convergence}$ is the duration of convergence toward the measured static temperature.

9. An aircraft comprising a system implementing the method of claim 1.

* * * * *

UNITED STATES PATENT AND TRADEMARK OFFICE
CERTIFICATE OF CORRECTION

PATENT NO. : 7,974,812 B2
APPLICATION NO. : 12/279371
DATED : July 5, 2011
INVENTOR(S) : Valerie Brivet et al.

It is certified that error appears in the above-identified patent and that said Letters Patent is hereby corrected as shown below:

Column 8, line 1, Claim 8, delete "$SAT_{measured}(t)-\Delta Tv2*(t-tV^2)T_{convergence,}$" and insert -- $SAT_{measured}(t)-\Delta T_{V2}*(t-t_{V2})/T_{convergence,}$ --, therefor.

Signed and Sealed this
Twenty-seventh Day of December, 2011

David J. Kappos
*Director of the United States Patent and Trademark Office*